United States Patent
Nicholson

(10) Patent No.: US 6,595,474 B2
(45) Date of Patent: Jul. 22, 2003

(54) UPPER LIMB ADAPTIVE AID

(75) Inventor: Bridgette F Nicholson, Palatine, IL (US)

(73) Assignee: Bridgette F. Nicholson, Streamwood, IL (US)

( * ) Notice: Subject to any disclaimer, the term of this patent is extended or adjusted under 35 U.S.C. 154(b) by 0 days.

(21) Appl. No.: 09/930,507

(22) Filed: Aug. 15, 2001

(65) Prior Publication Data

US 2002/0023986 A1 Feb. 28, 2002

Related U.S. Application Data

(60) Provisional application No. 60/227,999, filed on Aug. 25, 2000.

(51) Int. Cl.⁷ ................................................ B68G 5/00
(52) U.S. Cl. ..................................... 248/118; 280/304.1
(58) Field of Search ............................ 248/118, 118.1, 248/346.01, 346.5, 346.03; 280/250.1, 304.1, 647

(56) References Cited

U.S. PATENT DOCUMENTS

| | | | | | |
|---|---|---|---|---|---|
| 4,632,451 A | * | 12/1986 | Lee | ............................ | 297/153 |
| 5,242,180 A | * | 9/1993 | Bergeron | ................ | 280/250.1 |
| 5,284,131 A | * | 2/1994 | Gray | ........................ | 128/25 B |
| 5,458,354 A | * | 10/1995 | Bone | ....................... | 280/304.1 |
| 5,860,664 A | * | 1/1999 | Smith | ..................... | 280/250.1 |

* cited by examiner

*Primary Examiner*—Leslie A. Braun
*Assistant Examiner*—A. Joseph Wujciak, III

(57) ABSTRACT

The product comprises switches, restraints, limb supports, combination modules, and combinations thereof repositionably attached on a base for enabling individuals with various and changing limited controllable upper limb motion and with uncontrollable upper limb motions to have an upper limb positioned and restrained in order to use controllable motions to activate a switch.

6 Claims, 1 Drawing Sheet

UPPER LIMB ADAPTIVE AID

This application claims benefit of U.S. provisional application 60/227,999 filed Aug. 25, 2000.

The product is an adaptive aid for persons with limited and possibly uncontrolled hand and arm movement. The product enables adjustable positioning of various control devices by placement, height, and inclination in 3-dimensional space in order to permit operation of the control device via the person's available limb motion. In addition, the product restrains, positions, and supports the upper limbs to further facilitate the desired motion. The product can be reconfigured to accommodate various control devices and to utilize various motions.

For example, a control device such as a joystick can be used to control a cursor on a computer. A person may have difficulty holding their arm in the position necessary for using the joystick. Using the product, the joystick can be positioned to accommodate a suitable and comfortable position for the person's arm. In the same example, the product can be configured to support the person's arm in the preferred position for using the joystick.

In another example, the control device can be a pushbutton. Activating the pushbutton requires a different motion than the joystick, and the product can be reconfigured to hold the pushbutton in the required position. Various configurations allow an available range of motion of a person to be used, whatever motion that may be, to activate the control device. The product can be configured to accommodate right-handed, left-handed, and two-handed use.

The product comprises a base and switches, restraints, limb supports, combination modules, and combinations thereof. Holes in the base provide multiple attachment points for the switches, restraints, limb supports, combination modules, and combinations thereof. The switches, restraints, limb supports, combination modules, and combinations thereof can be attached and reattached in several configurations and combinations to meet the needs of various persons and the changing needs of one person.

For instance, a person can use the product to enable operation of a joystick for moving a cursor on a computer screen and, at a different time, to enable operation of a pushbutton for selecting television channels. These operations can require different arrangements of switches, restraints, limb supports, combination modules and combinations thereof attached to the base. More than one person, each having different hand and arm reach and motion requirements, can use the product at different times. Each person can configure the product to accommodate his or her requirements for a particular task.

Figure 1:
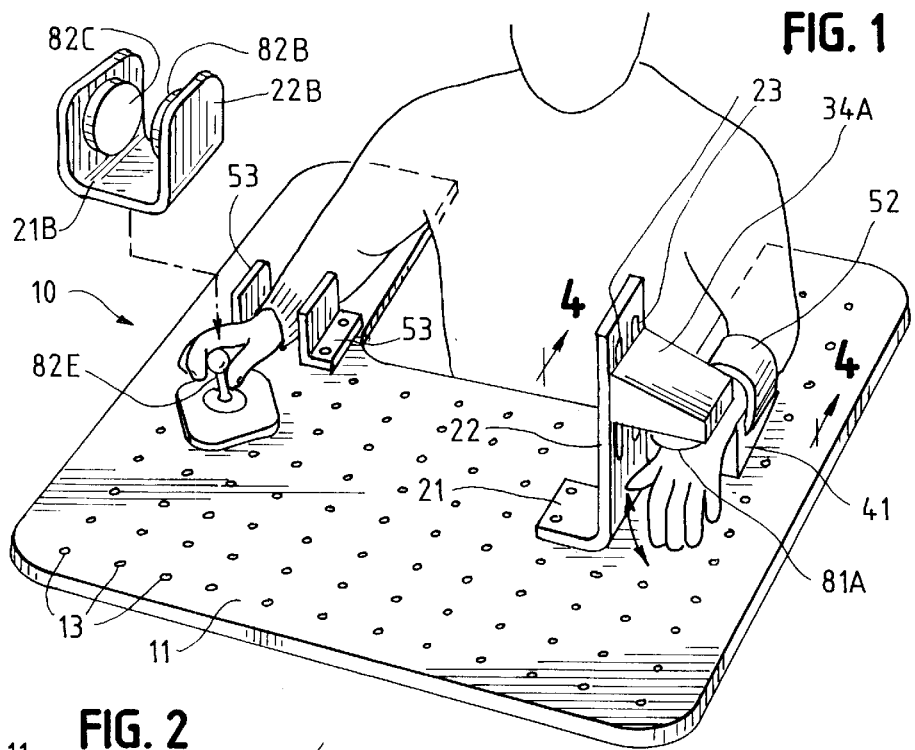
FIG. 1 depicts a product configuration in a perspective view.

The adaptive aid product 10, depicted in FIG. 1, comprises a base with a top surface 11 and a bottom surface 12. The bottom surface can be seen in FIG. 4. The base can be made of any material such as wood, plastic, and other materials, that possess the necessary structural qualities.

The product is designed to accommodate the requirements of people who can have unusual upper limb musculature and motion capabilities. These characteristics can make it difficult for them to manipulate objects placed in a typical, frontal-oriented workspace.

In order to accommodate the directionally skewed upper limb placement and motion available to some people, the base top surface must extend more than 30 centimeters along each of two orthogonal directions. Only a base larger than 30 centimeters along each of two orthogonal directions can accommodate the range of motion and reach requirements of most people. A base this size can accommodate people utilizing both right and left hands simultaneously.

The base has a plurality of holes 13 extending from the top surface toward the bottom surface. The holes are distributed across the top surface in order to provide a wide assortment of positioning sites. The holes shown in the accompanying figures are cylindrical and penetrate through the base, however any shape, depth, and spacing that fulfill the mating requirements of the switches, restraints, limb supports, combination modules, and combinations thereof are acceptable.

The base top surface can be any shape, such as curvilinear and polygonal, that meets the positioning requirements of the person. The shape can be symmetric, asymmetric, and irregular.

The base can be configured for mounting to a tabletop, chair, bed frame and other support structure. The base can be adjustable to various heights and inclinations.

The product can comprise switches. Switches convey a signal to a device. Switches can have many functions including accessing computers, communication systems, environmental controls, power wheelchairs, and general interactions with devices and people.

Switches are repositionably attachable to the base via the holes in the base. They can be attached and reattached in various configurations and combinations to meet changing hand and arm reach and motion requirements.

Figure 2:
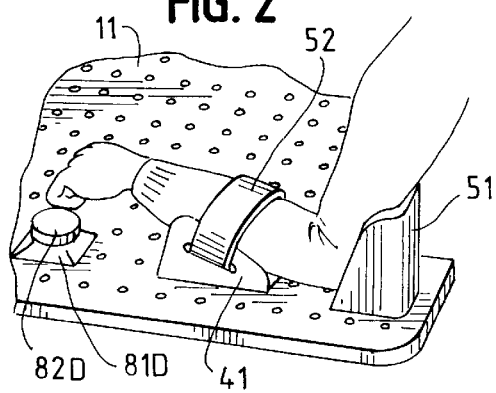
FIG. 2 depicts a partial perspective view of another product configuration.

Switches can comprise buttons, levers, toggles, joysticks, proximity switches, and combinations thereof. In FIG. 2, the pushbutton located under the left hand is an example of a switch. The pushbutton comprises a housing 81D and a button 82D.

The joystick 82E in FIG. 1, located under the right hand, is a switch. A double-pushbutton switch is seen in FIG. 1, on the right-hand side. The pushbuttons 82B and 82C are mounted on the base 21B and uprights 22B.

The product can comprise restraints. Restraints can limit limb motion, hold limbs in an optimum position, and provide directional stability.

Restraints are repositionably attachable to the base via the holes in the base. They can be attached and reattached in various configurations and combinations to meet changing hand and arm reach and motion requirements.

Restraints can comprise straps, channels, blocks, stabilizer bars, and combinations thereof. In FIG. 1, the wall restraints 53 prevent the right arm from moving away from the joystick.

Figure 3:
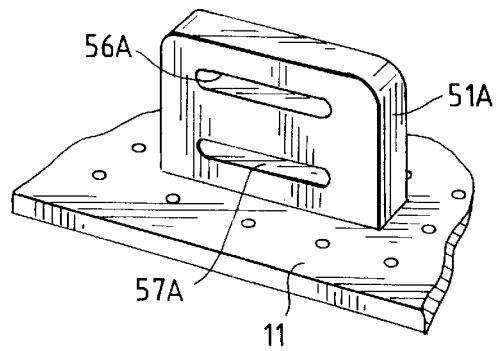
FIG. 3 depicts a perspective view of another product configuration.
Figure 5:
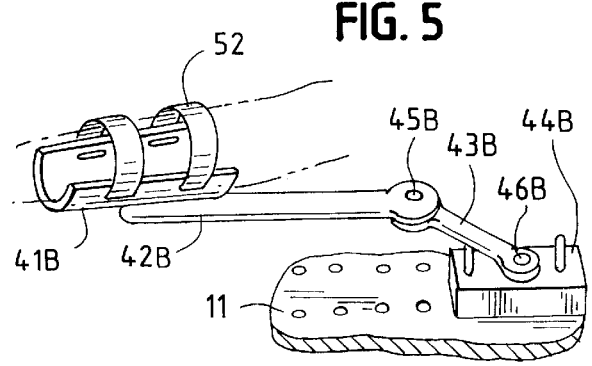
FIG. 5 depicts a perspective view of another product configuration.

In FIG. 2, the cradle restraint 51 restrains the left elbow joint in both the side-to-side and rearward directions. The strap restraint 52 holds the forearm in place. In FIG. 3, the double strap restraint comprises a body 51A with an upper strap slot 56A and a lower strap slot 57A. In FIG. 5, strap restraints 52 hold the forearm in place.

The product can comprise limb supports. Limb supports relieve muscles from the task of holding limbs in an optimum position.

Limb supports are repositionably attachable to the base via the holes in the base. They can be attached and reattached in various configurations and combinations to meet changing hand and arm reach and motion requirements.

Limb supports can comprise ramps, platforms, brackets, and combinations thereof.

In FIG. 2 a ramp support 41 is seen underneath the left forearm. FIG. 5 shows a multi-directional forearm support comprising a brace 41B, an upper arm 42B, a first pivot 45B, a lower arm 43B, a second pivot 46B, and a foundation 44B. This forearm support provides assisted motion and rotation in multiple directions.

The product can comprise combination modules. Combination modules combine at least two members selected from the module group consisting of switches, restraints, and limb supports. The selected members are positionally fixed, with respect to each other, within the combination module. The combination module is a single unit. The selected members that comprise the combination module cannot be separated into individual switches, restraints, and limb supports.

Combination modules are repositionably attachable to the base via the holes in the base. They can be attached and reattached in various configurations and combinations to meet changing hand and arm reach and motion requirements.

When a particular combination of switches, restraints, and limb supports is often used in conjunction, it can be manufactured as a single combination module. For instance, the wall restraints 53 and the joystick switch 82E shown in FIG. 1 can be incorporated into a single structure to provide the capabilities of the restraints and the switch.

A simple combination module is shown in FIG. 1 under the left arm. The combination module comprises a ramp support 41 that holds the left forearm at an angled position and a strap restraint 52 that restrains the forearm in place. This module can be combined with the pushbutton switch to form another example of a combination module.

In FIG. 2, the switch, the support, and the restraints shown could be manufactured as a single, multi-function combination module providing a pushbutton switch, ramp support, strap restraint, and cradle restraint.

Figure 4:
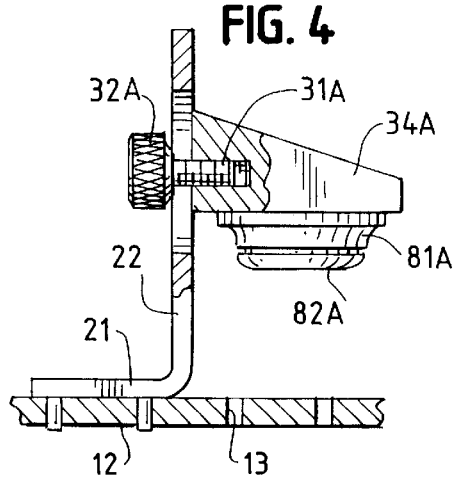
FIG. 4 depicts a view across line 4—4 in FIG. 1.

Switches, restraints, limb supports, and combination modules can provide height, position and inclination adjustability. In FIG. 1 above the left hand, the pushbutton switch 81A is supported by a base 21, and an upright 22, with slots 23 to enable height adjustability. The switch is also seen in FIG. 4.

The limb support seen in FIG. 5 utilizes upper and lower arms, pivot connections, and a foundation to enable adjustability in multiple directions.

Various features such as stands, telescoping supports, gooseneck supports, tilt supports, and combinations thereof can be incorporated into switches, restraints, limb supports, and combination modules to enable height, position and inclination adjustability.

To facilitate the adaptability of the product, switches, restraints, limb supports, combination modules, and combinations thereof can be connected to the base, to each other, and to other equipment.

Connectors used with switches, restraints, limb supports, combination modules, and combinations thereof and with the base can be integral parts of switches, restraints, limb supports and combination modules and they can be separate devices. Connections can be made between integral parts, such as tapped holes, and separate devices such as commercial bolts.

A connector is shown in FIG. 4. The connector comprises a threaded male part 31A, a handle 32A, and female threads integrated into the mounting block 34A. Tightening the connector clamps it in place on the switch upright 22.

Connectors can be of any design that meets the mating requirements of the base, switches, restraints, limb supports, combination modules, and combinations thereof. They can be commercially available items such as threaded fasteners, spring-loaded locking devices, friction-fit devices, simple pegs and other types. They can also be specially designed variations of standard devices, and unique designs.

Claimed is:

1. An adjustable hand and arm adaptive aid product comprising:

a base, the base having a top surface and bottom surface, the top surface extending more than 30 centimeters along each of two orthogonal directions in order to accommodate changing hand and arm reach and motion requirements;

the base having a plurality of holes, the plurality of holes extending from the top surface toward the bottom surface, the plurality of holes being distributed across the top surface;

a switch, the switch in use conveying a signal to a device, the switch in use being repositionably attached through at least a first hole selected from the plurality of holes in order to accommodate changing hand and arm reach and motion requirements; and a restraint, the restraint in use restraining an upper limb, the restraint in use being repositionably attached through at least a second hole selected from the plurality of holes to accommodate changing hand and arm reach and motion requirements.

2. The product of claim 1 further comprising:

a limb support, the limb support in use supporting an upper limb, the limb support in use being repositionably attached through at least a third hole selected from the plurality of holes to accommodate changing hand and arm reach and motion requirements.

3. The product of claim 1 further comprising:

a combination module, the combination module fixedly combining at least two members selected from the module group consisting of switches, restraints, and limb supports, the combination module in use being repositionably attached through at least a fourth hole selected from the plurality of holes to accommodate changing hand and arm reach and motion requirements.

4. An adjustable hand and arm adaptive aid product comprising:

a base, the base having a top surface and bottom surface, the top surface extending more than 30 centimeters along each of two orthogonal directions in order to accommodate changing hand and arm reach and motion requirements;

the base having a plurality of holes, the plurality of holes extending from the top surface toward the bottom surface, the plurality of holes being distributed across the top surface;

a switch, the switch in use conveying a signal to a device, the switch in use being repositionably attached through at least a first hole selected from the plurality of holes in order to accommodate changing hand and arm reach and motion requirements;

a restraint, the restraint in use restraining an upper limb, the restraint in use being repositionably attached through at least a second hole selected from the plurality of holes to accommodate changing hand and arm reach and motion requirements; and a limb support, the limb support in use supporting an upper limb, the limb support in use being repositionably attached through at least a third hole selected from the plurality of holes to accommodate changing hand and arm reach and motion requirements.

5. The product of claim 4 further comprising:

a combination module, the combination module fixedly combining at least two elements selected from the module group consisting of switches, restraints, and limb supports, the combination module in use being repositionably attached through at least a fourth hole selected from the plurality of holes to accommodate changing hand and arm reach and motion requirements.

6. An adjustable hand and arm adaptive aid product comprising:

a base, the base having a top surface and bottom surface, the top surface extending more than 30 centimeters along each of two orthogonal directions in order to accommodate changing hand and arm reach and motion requirements;

the base having a plurality of holes, the plurality of holes extending from the top surface toward the bottom surface, the plurality of holes being distributed across the top surface;

a switch, the switch in use conveying a signal to a device, the switch in use being repositionably attached through at least a first hole selected from the plurality of holes in order to accommodate changing hand and arm reach and motion requirements;

a restraint, the restraint in use restraining an upper limb, the restraint in use being repositionably attached through at least a second hole selected from the plurality of holes to accommodate changing hand and arm reach and motion requirements;

a limb support, the limb support in use supporting an upper limb, the limb support in use being repositionably attached through at least a third hole selected from the plurality of holes to accommodate changing hand and arm reach and motion requirements; and a combination module, the combination module fixedly combining at least two members selected from the module group consisting of switches, restraints, and limb supports, the combination module in use being repositionably attached through at least a fourth hole selected from the plurality of holes to accommodate changing hand and arm reach and motion requirements.

* * * * *